United States Patent
Choi et al.

(10) Patent No.: US 10,327,203 B2
(45) Date of Patent: Jun. 18, 2019

(54) UL MU TRANSMISSION METHOD OF STA OPERATING IN POWER SAVE MODE, AND DEVICE FOR PERFORMING METHOD

(71) Applicant: LG ELECTRONICS INC., Seoul (KR)

(72) Inventors: Hyeyoung Choi, Seoul (KR); Kiseon Ryu, Seoul (KR); Jeongki Kim, Seoul (KR); Hangyu Cho, Seoul (KR); Suhwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/570,297

(22) PCT Filed: Feb. 17, 2016

(86) PCT No.: PCT/KR2016/001581
§ 371 (c)(1),
(2) Date: Oct. 27, 2017

(87) PCT Pub. No.: WO2016/175435
PCT Pub. Date: Nov. 3, 2016

(65) Prior Publication Data
US 2018/0132175 A1    May 10, 2018

Related U.S. Application Data

(60) Provisional application No. 62/154,133, filed on Apr. 29, 2015, provisional application No. 62/157,977, filed on May 7, 2015.

(51) Int. Cl.
*H04W 52/02*   (2009.01)
*H04W 72/12*   (2009.01)
(Continued)

(52) U.S. Cl.
CPC ....... *H04W 52/0206* (2013.01); *H04W 52/02* (2013.01); *H04W 52/0219* (2013.01);
(Continued)

(58) Field of Classification Search
CPC . H04W 52/02; H04W 52/0206; H04W 72/12; H04W 72/0446; H04W 76/28;
(Continued)

(56) References Cited

U.S. PATENT DOCUMENTS

2013/0188541 A1* 7/2013 Fischer ................ H04W 72/06
                                                                  370/311
2013/0229996 A1* 9/2013 Wang ................ H04W 72/0413
                                                                  370/329
(Continued)

FOREIGN PATENT DOCUMENTS

EP         3251422        12/2017
KR      1020140121907     10/2014
WO        2016123403       8/2016

OTHER PUBLICATIONS

PCT International Application No. PCT/KR2016/001581, International Search Report dated May 3, 2016, 5 pages.
(Continued)

*Primary Examiner* — Kevin D Mew
(74) *Attorney, Agent, or Firm* — Lee Hong Degerman Kang Waimey

(57) ABSTRACT

A method for UL MU transmission of an STA operating in a power save mode comprises the steps of: transmitting a TWT request element including first information related to a requested TBTT of a first beacon frame and second information related to a requested wake interval between subsequent beacon frames the STA intends to receive to an AP; receiving a TWT response element from the AP in response to the TWT request element; switching to a doze
(Continued)

state from the awake state after receiving the TWT response element; switching to the awake state from the doze state based on the third information in order to receive the first beacon frame from the AP; receiving the first beacon frame including fifth information related to a trigger transmission time of a trigger frame soliciting the UL MU transmission from one or more STAs from the AP.

4 Claims, 7 Drawing Sheets

(51) Int. Cl.
    *H04W 84/12* (2009.01)
    *H04W 76/28* (2018.01)
    *H04W 72/04* (2009.01)
    *H04W 88/08* (2009.01)

(52) U.S. Cl.
    CPC ....... *H04W 72/0446* (2013.01); *H04W 72/12* (2013.01); *H04W 76/28* (2018.02); *H04W 84/12* (2013.01); *H04W 88/08* (2013.01); *Y02D 70/00* (2018.01); *Y02D 70/1262* (2018.01); *Y02D 70/14* (2018.01); *Y02D 70/142* (2018.01); *Y02D 70/21* (2018.01); *Y02D 70/22* (2018.01)

(58) Field of Classification Search
    CPC ...... H04W 84/12; H04W 88/08; Y02D 70/00; Y02D 70/14
    See application file for complete search history.

(56) References Cited

U.S. PATENT DOCUMENTS

| | | | |
|---|---|---|---|
| 2014/0071873 A1* | 3/2014 | Wang | H04W 74/08 370/311 |
| 2014/0071900 A1* | 3/2014 | Park | H04W 74/04 370/329 |
| 2014/0112226 A1* | 4/2014 | Jafarian | H04W 52/0229 370/311 |
| 2014/0112229 A1* | 4/2014 | Merlin | H04W 52/0209 370/311 |
| 2014/0119186 A1* | 5/2014 | Wong | H04L 47/30 370/235 |
| 2014/0247780 A1* | 9/2014 | Jafarian | H04W 72/0446 370/329 |
| 2014/0313952 A1* | 10/2014 | Ghosh | H04L 1/00 370/311 |
| 2014/0328195 A1* | 11/2014 | Sampath | H04W 72/082 370/252 |
| 2014/0355434 A1* | 12/2014 | Jafarian | H04W 28/12 370/230.1 |
| 2015/0036572 A1* | 2/2015 | Seok | H04W 52/0216 370/311 |
| 2015/0063111 A1* | 3/2015 | Merlin | H04L 47/12 370/235 |
| 2015/0063182 A1* | 3/2015 | Wang | H04W 16/14 370/311 |
| 2015/0063190 A1 | 3/2015 | Merlin et al. | |
| 2015/0071211 A1* | 3/2015 | Seok | H04W 74/04 370/329 |
| 2015/0098377 A1* | 4/2015 | Amini | H04W 76/10 370/311 |
| 2015/0327262 A1* | 11/2015 | Kwon | H04W 72/1289 370/329 |
| 2015/0327265 A1* | 11/2015 | Lee | H04W 72/0446 370/311 |
| 2016/0100361 A1* | 4/2016 | Zheng | H04W 52/0216 455/522 |

OTHER PUBLICATIONS

European Patent Office Application Serial No. 16786622.7, Search Report dated Nov. 6, 2018, 9 pages.

\* cited by examiner

UL MU TRANSMISSION METHOD OF STA OPERATING IN POWER SAVE MODE, AND DEVICE FOR PERFORMING METHOD

CROSS-REFERENCE TO RELATED APPLICATIONS

This application is the National Stage filing under 35 U.S.C. 371 of International Application No. PCT/KR2016/001581, filed on Feb. 17, 2016, which claims the benefit of U.S. Provisional Application No. 62/154,133, filed on Apr. 29, 2015 and 62/157,977, filed on May 7, 2015, the contents of which are all hereby incorporated by reference herein in their entirety.

BACKGROUND OF THE INVENTION

Field of the Invention

The present invention relates to wireless communication, and more particularly, to a uplink (UL) multi-user (MU) transmission method of a station (STA) operating in a power save mode and a device for performing the method.

Related Art

The main goals of the next-generation WLAN are 1) to improve an institute of electronic and electronics engineers (IEEE) 802.11 physical (PHY) layer and a medium access control (MAC) layer in bands of 2.4 GHz and 5 GHz, 2) to increase spectrum efficiency and area throughput, and 3) to improve performance in actual indoor and outdoor environments, such as an environment in which an interference source exists, a dense heterogeneous network environment, an environment in which a high user load exists, and so on.

The environment that is mainly considered in the next-generation WLAN is a dense environment, wherein numerous access points (APs) and stations (STAs) exist, and improvement of spectrum efficiency and area throughput in such dense environment is being discussed. Moreover, in addition to the improvement of the indoor environment, improvement of actual performance in outdoor environments, which were not deeply considered in the legacy WLAN, is being taken into consideration in the next generation WLAN.

More specifically, scenarios, such as wireless offices, smart homes, stadiums, and Hotspots, are being considered in the next generation WLAN. Based on the corresponding scenarios, discussions are being carried out on the improvement in the performance of a wireless LAN system in environment, wherein APs and STAs are densely located.

Further, in the next generation WLAN, active discussion is expected on system performance improvement in an overlapping basic service set (OBSS) environment, outdoor environmental performance improvement, cellular offloading, or the like, rather than single link performance improvement in one basic service set (BSS). Directionality of the next generation WLAN implies that the next generation WLAN gradually has a technical range similar to mobile communication. Recently, considering that mobile communication and WLAN technologies are discussed together in a small cell and a direct-to-direct (D2D) communication region, technology and business convergence of the next generation WLAN and the mobile communication is expected to be more active.

SUMMARY OF THE INVENTION

An object of the present invention is to provide a method of an uplink (UL) multi-user (MU) transmission method of a station (STA) operating in a power save mode in a wireless local area (WLAN) mode.

Another object of the present invention is to provide a device for performing UL MU transmission while operating in a power save mode.

According to an aspect of the present invention, there is provided a UL MU transmission method of an STA operating in a power save mode. The method may include: transmitting, by the STA, a target wakeup time (TWT) request element to an access point (AP); receiving, by the STA, a TWT response element from the AP in response to the TWT request element, wherein the TWT response element includes information regarding a target wake time; receiving, by the STA, a beacon frame from the AP by transitioning from a doze state to an awake state on the basis of the target wake time; receiving, by the STA, a trigger frame from the AP on the basis of TWT information of the beacon frame; and transmitting, by the STA, an uplink frame to the AP by using the UL MU transmission on the basis of the trigger frame. The TWT information may include information regarding transmission of the trigger frame transmitted after the beacon frame.

According to another aspect of the present invention, there is provided an STA for performing a UL MU transmission method while operating in a power save mode. The STA may include: a radio frequency (RF) unit implemented to transmit or receive a radio signal; and a processor operatively coupled to the RF unit. The processor may be configured for: transmitting a TWT request element to an AP; receiving a TWT response element including information regarding a target wake time in response to the TWT request element; receiving a beacon frame from the AP by transitioning from a doze state to an awake state on the basis of the target wake time; receiving a trigger frame from the AP on the basis of TWT information of the beacon frame; and transmitting an uplink frame to the AP by using the UL MU transmission on the basis of the trigger frame. The TWT information may include information regarding transmission of the trigger frame transmitted after the beacon frame.

A station (STA) performing uplink (UL) multi-user (MU) transmission can save power by operating in an awake state at a target transmission time of a trigger frame.

DESCRIPTION OF EXEMPLARY EMBODIMENTS

Figure 1:
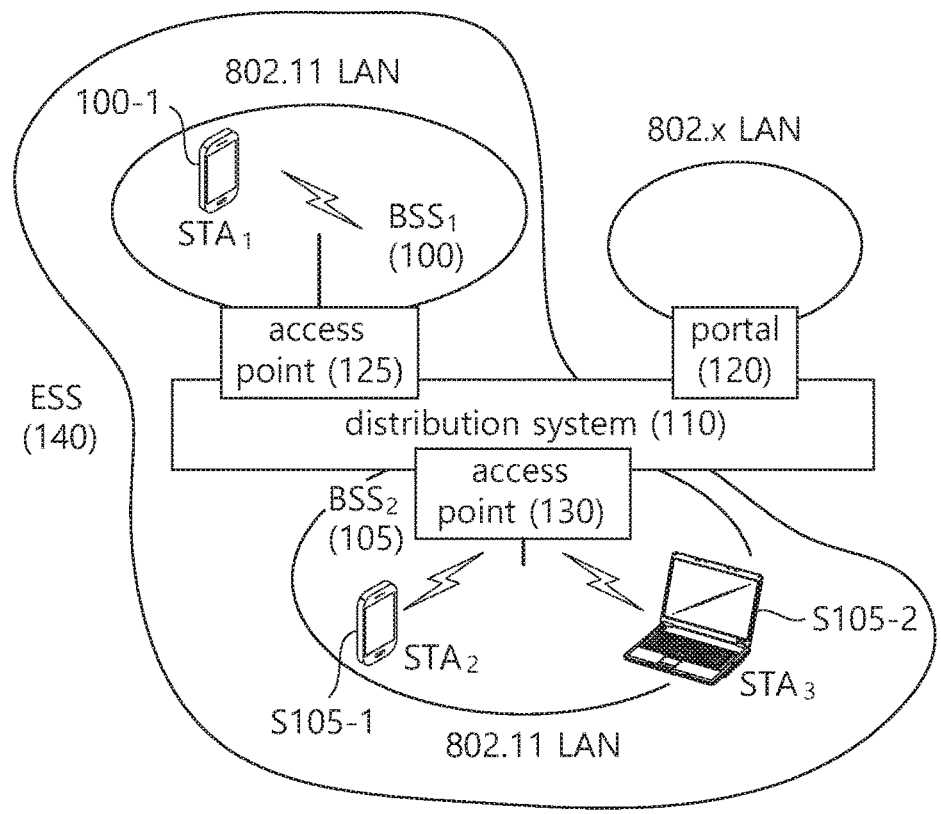
FIG. 1 is a conceptual view illustrating a structure of a wireless local area network (WLAN).
Figure 1:
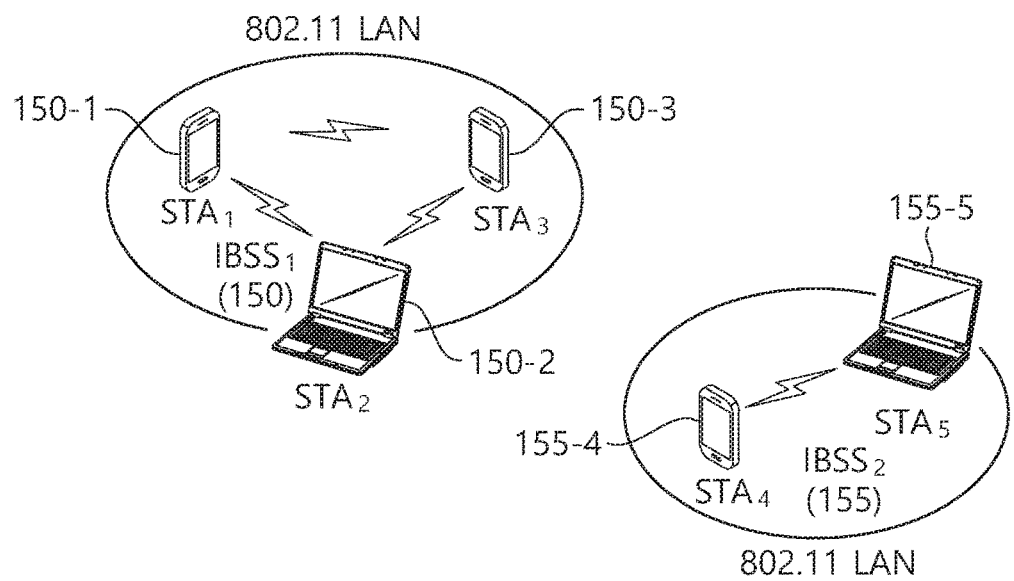

FIG. 1 is a conceptual view illustrating a structure of a wireless local area network (WLAN).

An upper part of FIG. 1 shows the structure of the institute of electrical and electronic engineers (IEEE) 802.11 infrastructure network.

Referring to the upper part of FIG. 1, the WLAN system may include one or more basic service sets (BSSs) 100 and 105. The BSS 100 or 105 is a set of an access point (AP) such as AP 125 and a station (STA) such as STA1 100-1 that may successfully sync with each other to communicate with each other and is not the concept to indicate a particular area. The BSS 105 may include one AP 130 and one or more STAs 105-1 and 105-2 connectable to the AP 130.

The infrastructure BSS may include at least one STA, APs 125 and 130 providing a distribution service, and a distribution system (DS) 110 connecting multiple APs.

The distribution system 110 may implement an extended service set (ESS) 140 by connecting a number of BSSs 100 and 105. The ESS 140 may be used as a term to denote one network configured of one or more APs 125 and 130 connected via the distribution system 110. The APs included in one ESS 140 may have the same service set identification (SSID).

The portal 120 may function as a bridge that performs connection of the WLAN network (IEEE 802.11) with other network (for example, 802.X).

In the infrastructure network as shown in the upper part of FIG. 1, a network between the APs 125 and 130 and a network between the APs 125 and 130 and the STAs 100-1, 105-1, and 105-2 may be implemented. However, without the APs 125 and 130, a network may be established between the STAs to perform communication. The network that is established between the STAs without the APs 125 and 130 to perform communication is defined as an ad-hoc network or an independent basic service set (BSS).

A lower part of FIG. 1 is a concept view illustrating an independent BSS.

Referring to the lower part of FIG. 1, the independent BSS (IBSS) is a BSS operating in ad-hoc mode. The IBSS does not include an AP, so that it lacks a centralized management entity. In other words, in the IBSS, the STAs 150-1, 150-2, 150-3, 155-4 and 155-5 are managed in a distributed manner. In the IBSS, all of the STAs 150-1, 150-2, 150-3, 155-4 and 155-5 may be mobile STAs, and access to the distribution system is not allowed so that the IBSS forms a self-contained network.

The STA is some functional medium that includes a medium access control (MAC) following the Institute of Electrical and Electronics Engineers (IEEE) 802.11 standards and that includes a physical layer interface for radio media, and the term "STA" may, in its definition, include both an AP and a non-AP station (STA).

The STA may be referred to by various terms such as mobile terminal, wireless device, wireless transmit/receive unit (WTRU), user equipment (UE), mobile station (MS), mobile subscriber unit, or simply referred to as a user.

Hereinafter, in an embodiment of the present invention, data (or a frame) to be transmitted from the AP to the STA may be expressed by the term 'downlink data (or a downlink frame)', and data (or a frame) to be transmitted from the STA to the AP may be expressed by the term 'uplink data (or an uplink frame)'. In addition, transmission from the AP to the STA may be expressed by the term 'downlink transmission', and transmission from the STA to the AP may be expressed by the term 'uplink transmission'.

Further, a physical layer (PHY) protocol data unit (PPDU), frame, and data transmitted through downlink transmission may be expressed respectively by the term "downlink PPDU", "downlink frame", and "downlink data". The PPDU may be a data unit including a PPDU header and a physical layer service data unit (PSDU) (or a MAC protocol data unit (MPDU)). The PPDU header may include a PHY header and a PHY preamble, and the PSDU (or MPDU) may include a frame (or an information unit of a MAC layer) or may be a data unit indicating the frame. The PHY header may be expressed by the term "physical layer convergence protocol (PLCP) header", and the PHY preamble may be expressed by the term "PLCP preamble".

Further, a PPDU, frame, and data transmitted through uplink transmission may be expressed respectively by the term "uplink PPDU", "uplink frame", and "uplink data".

In the conventional WLAN system, a full bandwidth is used for downlink transmission to one STA and uplink transmission to one STA on the basis of single (SU)-orthogonal frequency division multiplexing (OFDM) transmission. Further, in the conventional WLAN system, an AP may perform downlink (DL) multi-user (MU) transmission on the basis of MU multiple input multiple output (MIMO), and such transmission may be expressed by the term "DL MU MIMO transmission".

In a WLAN system according to an embodiment of the present invention, a transmission method based on orthogonal frequency division multiple access (OFDMA) may be supported for uplink transmission and downlink transmission. More specifically, in the WLAN system according to the embodiment of the present invention, an AP may perform DL MU transmission based on OFDMA, and such transmission may be expressed by the term "DL MU OFDMA transmission". When the DL MU OFDMA transmission is performed, the AP may transmit downlink data (or downlink frame, downlink frame PPDU) to each of a plurality of STAs on overlapping time resources through a plurality of frequency resources (a plurality of subbands (or subchannels)). A plurality of frequency resources may be a plurality of subbands (or subchannels) or a plurality of resource units (RUs) (e.g., a basic resource unit (BRU) defined as a different size). The DL MU OFDMA transmission may be used together with the DL MU MIMO transmission. For example, DL MU-MIMO transmission based on a plurality of space-time streams (or spatial streams) may be performed on a specific subband (or subchannel) allocated for the DL MU OFDMA transmission.

Further, in the WLAN system according to the embodiment of the present invention, uplink (UL) multi-user (MU) transmission may be supported so that the plurality of STAs transmit data to the AP on the same time resource. Uplink transmission on an overlapping time resource may be performed by each of the plurality of STAs on a frequency domain or a spatial domain.

When the uplink transmission is performed by each of the plurality of STAs on the frequency domain, a different frequency resource may be allocated for each of the plurality of STAs as an uplink transmission resource. The different frequency resource may be a different subband (or subchannel) or a different resource unit (RU). Each of the plurality of STAs may transmit uplink data to the AP through the allocated different frequency resource. A transmission method through the different frequency resource may be expressed by the term "UL MU OFDMA transmission method".

When the uplink transmission is performed by each of the plurality of STAs on the spatial domain, a different space-time stream (or spatial stream) may be allocated to each of the plurality of STAs, and each of the plurality of STAs may transmit uplink data to the AP through the different space-time stream. A transmission method through the different spatial stream may be expressed by the term "UL MU MIMO transmission method".

UL MU OFDMA transmission and UL MU MIMO transmission may be performed together. For example, UL MU MIMO transmission based on a plurality of space-time streams (or spatial streams) may be performed on a specific subband (or subchannel) allocated for UL MU OFDMA transmission.

In the conventional WLAN system not supporting MU OFDMA transmission, a multi-channel allocation method is used to allocate a wider bandwidth (e.g., a bandwidth exceeding 20 MHz) to one UE. A multi-channel may include a plurality of 20 MHz channels when one channel unit is 20 MHz. In the multi-channel allocation method, a primary channel rule is used to allocate a wider bandwidth to the UE. In case of using the primary channel rule, there is a restriction for allocating the wider bandwidth to the UE. Specifically, according to the primary channel rule, if a secondary channel adjacent to the primary channel is 'busy' since it is used in an overlapped BSS (OBSS), an STA cannot use the remaining channels other than the primary channel. Therefore, since the STA can transmit a frame only through the primary channel, frame transmission through the multi-channel is restricted. That is, the primary channel rule used for multi-channel allocation in the conventional WLAN system operates a wider bandwidth in the WLAN environment in which not many OBSSs exist, which may be a significant restriction when intending to obtain a high throughput.

To solve such a problem, an embodiment of the present invention provides a WLAN system supporting an orthogonal frequency division multiple access (OFDMA) technique. In case of using the OFDMA technique, the multi-channel may be used not by one UE but by a plurality of UEs simultaneously without a restriction based on the primary channel rule. Therefore, it is possible to operate the wider bandwidth, and efficiency of operating radio resources can be improved.

A time-frequency structure assumed in the WLAN system according to an embodiment of the present invention may be as follows for example.

A fast Fourier transform (FFT) size/inverse fast Fourier transform (IFFT) size may be defined as N-fold (where N is a natural number, for example, N=4) of an FFT/IFFT size used in the conventional WLAN system. For example, 256FFT/IFFT may be applied to a 20 MHz bandwidth, 512FFT/IFFT may be applied to a 40 MHz bandwidth, 1024FFT/IFFT may be applied to an 80 MHz bandwidth, and 2048FFT/IFFT may be applied to a continuous 160 MHz or a non-continuous 160 MHz bandwidth.

A subcarrier spacing may have a size corresponding to 1/N fold (where N is a natural number, for example, if N=4, 78.125 kHz) of a subcarrier spacing used in the conventional WLAN system.

An inverse discrete Fourier transform (IDFT)/discrete Fourier transform (DFT) length (or a valid symbol length) based on IDFT/DFT (or FFT/IFFT) may be N-fold of an IDFT/DFT length used in the conventional WLAN system. For example, if the IDFT/DFT length is 3.2 μs and N=4, the IDFT/DFT length in the WLAN system according to an embodiment of the present invention may be 3.2ρs×4(=12.8 μs).

An OFDM symbol length may be obtained by adding a guard interval (GI) length to the IDFT/DFT length. The GI length may be various such as 0.4 μs, 0.8 μs, 1.6 μs, 2.4 μs, and 3.2 μs.

In order to improve the throughput of the WLAN system or to improve robustness for inter-symbol interference (ISI) in an outdoor environment, IFFT/FFT improved from the previous one may be applied in an available system bandwidth. For example, when 128IFFT/FFT (double IFFT/FFT) or 256IFFT/FFT (quadruple IFFT/FFT) is applied instead of 64IFFT/FFT at a 20 MHz bandwidth, the WLAN system may be designated by decreasing a ratio of cyclic prefix (CP) portion to obtain a throughput gain corresponding to a decreased CP length. Alternatively, the CP ratio may be maintained to decrease performance deterioration caused by ISI in the outdoor environment on the basis of an increased CP duration.

Figure 2:
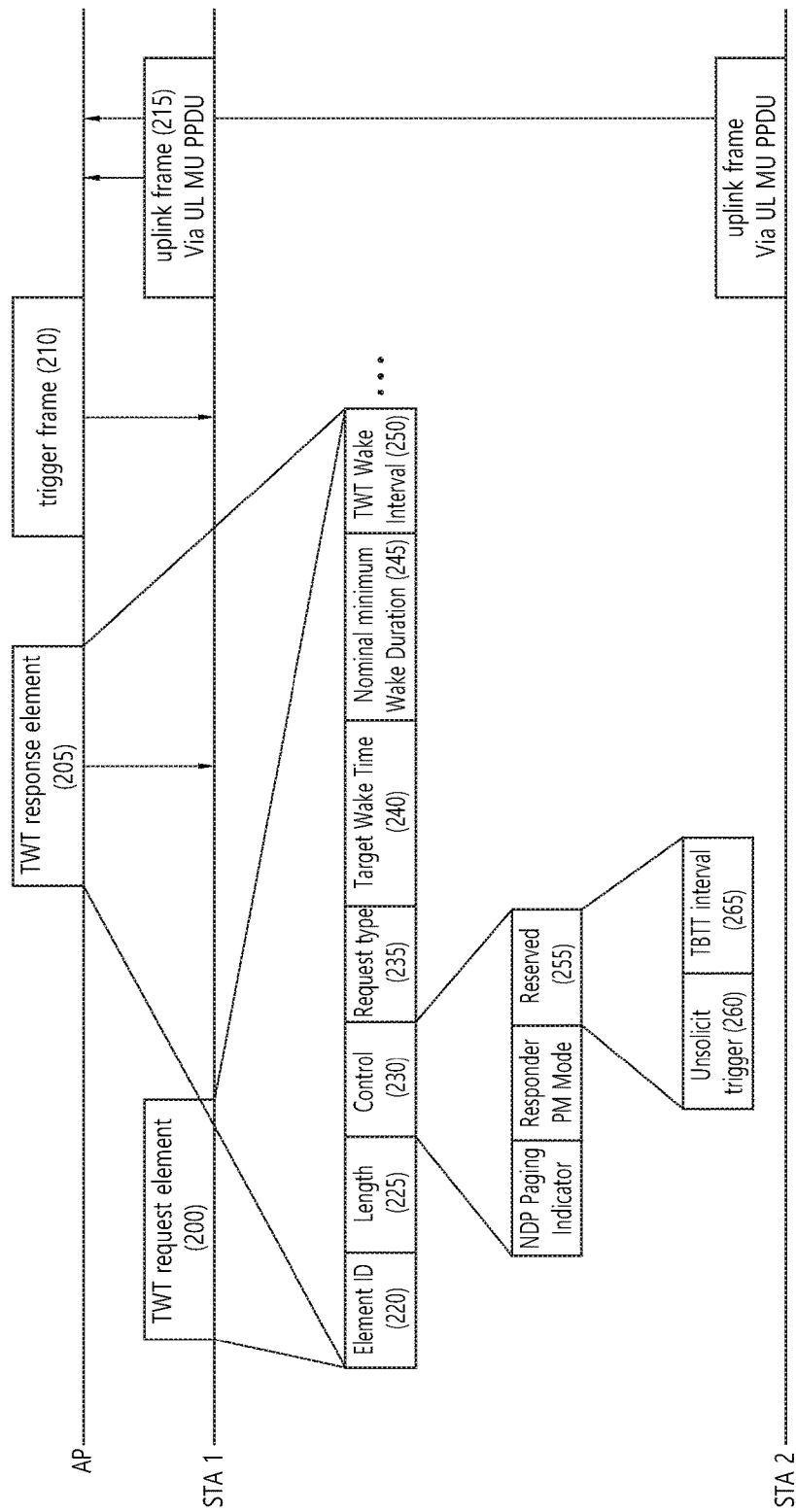
FIG. 2 is a concept view illustrating a trigger method of uplink (UL) multi-user (MU) transmission according to an embodiment of the present invention.

FIG. 2 is a concept view illustrating a trigger method of UL MU transmission according to an embodiment of the present invention.

Referring to FIG. 2, an AP may transmit a trigger frame 210 for triggering transmission of a plurality of uplink frames (or UL MU PHY protocol data unit (PPDU)) 215 by using a plurality of STAs, and the plurality of STAs may perform UL MU transmission on the basis of the trigger frame 210 transmitted by the AP.

The plurality of STAs may receive the trigger frame 210 from the AP, and may transmit the UL MU PPDU on the basis of the trigger frame 210. The AP may transmit information regarding a transmission time of the trigger frame 210 to the plurality of STAs. The plurality of STAs may receive the trigger frame 210 on the basis of the information regarding the transmission time of the trigger frame 210, and may transmit a plurality of UL MU PPDUs in response to the trigger frame 210. The plurality of STAs operating in a power save mode may transition from a doze state to an awake state to receive the trigger frame 210 at the transmission time of the trigger frame 210.

The STA operating in the power save mode may save power while transitioning between the doze state and the awake state. The doze state may be a state in which frame transmission/reception is not performed by the TA to save power, and the awake state may be a state in which frame transmission/reception is performed by the STA.

The trigger frame 210 may include identification information of the plurality of STAs for transmitting the UL MU PPDU by being triggered on the basis of the trigger frame 210 and information regarding a resource unit for transmission of the UL MU PPDU of each of the plurality of STAs identified on the basis of the trigger frame 210.

A transmission time of the trigger frame 210 may be a target transmission time, and information regarding the target transmission time may be transmitted on the basis of a target wakeup time (TWT) element. The TWT may be a time resource configured to manage activity in a BSS. It may be defined to reduce contention between STAs and to minimize an STA operation for the awake state by allowing the STA to operate at a different time on the basis of the TWT configuration. An STA for requesting the TWT may be a TWT request STA, and an STA for communicating with the TWT request STA at the request of the TWT may be a TWT response STA. For example, the TWT request STA may be an STA, and the TWT response STA may be an AP.

Hereinafter, for convenience of explanation, a TWT element transmitted by the STA, which is the TWT request STA, may be expressed as a TWT request element 200, and a TWT element transmitted by the AP, which is the TWT response STA, may be expressed as a TWT response element 205. The TWT request element 200 and the TWT response element 205 may be distinguished on the basis of a specific indicator (or field) in the TWT element. The TWT request element 200 and the TWT response element 205 may have a format having the same field included therein or a format having a partially different field included therein.

First, in order for the STA to receive a scheduled trigger frame from the AP, a UL traffic pattern of the STA or a TWT pattern (or TWT parameter) determined on the basis of a quality of service (QoS) request or the like may be transmitted to the AP by using the TWT request element 200. The TWT pattern may be a periodic pattern or an aperiodic pattern as an operational pattern for communication between the STA and the AP. For example, if a request type field of the TWT request element 200 is set to a predefined bit value (e.g., '1'), the TWT request element 200 may be used to request the AP in advance to transmit information regarding a target transmission time for the trigger frame. Alternatively, the TWT request element 200 may be used to request for a TWT for reception of the trigger frame.

Alternatively, if the STA intends to receive information regarding the target transmission time of the trigger frame 210 to be transmitted by using the TWT response element 205 of the beacon frame transmitted by the AP, one bit may be used among reserved bits 255 of a control field 230 of the TWT request element 200 to request the AP for the information regarding the target transmission time of the trigger frame 210.

In addition, the STA may use the reserved bits 255 of the control field 230 to deliver information regarding a TBTT interval or the number of TBTTs for performing an operation to the AP, and thus may request for transmission of the information regarding the target transmission time of the trigger frame 210 by using the TWT response element 205 of the beacon frame during a specific time duration. For example, the STA may use the reserved bits 255 of the control field 230 to transmit to the AP the information regarding the number of TBTTs for receiving the information regarding the target transmission time of the trigger frame 210, and the AP may transmit the information regarding the target transmission time for the trigger frame 210 by using the TWT response element 205 of the beacon frame during a time duration corresponding to the number of TBTTs determined by the STA. Alternatively, the STA may use the reserved bits 255 to transmit to the AP the information regarding the TBTT interval for receiving the information regarding the target transmission time of the trigger frame, and the AP may transmit the information regarding the target transmission time for the trigger frame 210 by using the TWT response element 205 of the beacon frame during a time duration corresponding to the TBTT interval determined by the STA.

That is, an STA (or TWT request STA, TWT scheduled STA) intending to operate in a power save mode may transmit to an AP (or TWT response STA, TWT scheduling STA) a frame (or TWT request frame) including the TWT request element. The TWT request frame (TWT request element) may include information regarding a TBTT of a next beacon frame and information regarding an interval between subsequent beacon frames to be received by the STA. An AP which is a TWT scheduling STA may determine a TBTT of a next beacon frame to be received by the STA and an interval between subsequent beacon frames to be received by the STA.

Specifically, the TWT request frame (TWT request element) may include the following values.

If a TWT command field indicates a suggest TWT or a demand TWT, the TWT request frame (TWT request element) may include first TBTT information requested in a target wake time field.

If the TWT command field indicates the suggest TWT, a target transmission time of a trigger frame may be determined by a TWT scheduling STA (or TWT response STA). Specifically, if the TWT command field is the suggest TWT, the TWT request frame transmitted by the TWT request STA may include the target wake time field and other TWT parameters. The TWT scheduled STA (or TWT request STA) may perform a TWT configuration procedure even if the target wake time field suggested by the TWT request frame is not applied.

If the TWT command field is the suggest TWT, the target transmission time of the trigger frame may be determined by the TWT scheduled STA (or TWT request STA). Specifically, if the TWT command field is the suggest TWT, the TWT request frame may include information regarding the target wake time field and other TWT parameters. The TWT scheduled STA (or TWT request STA) may not perform the TWT configuration procedure if the target wake time field suggested by the TWT request frame is not applied.

In addition, the TWT request frame (TWT request element) may include a TWT wake interval mantissa field and a TWT wake interval exponent field. The TWT wake interval mantissa field and the TWT wake interval exponent field may include information regarding a listen interval between consecutive TBTTs.

The TWT wake interval mantissa field may include information regarding a mantissa for determining a target wake interval. The TWT wake interval exponent field may include information regarding an exponent value for determining a target wake interval with a base of 2.

A size of the target wake interval may be determined on the basis of a TWT wake interval mantissa $\times$ $2^{(TWT\ wake\ interval\ exponent)}$.

In addition, according to an embodiment of the present invention, upon receiving the TWT request frame (TWT request element) from an STA of which a TWT wake interval is the same as a listen interval of the STA, in response thereto, the TWT response STA may provide an accept TWT or a reject TWT as a TWT response frame (or TWT response element) indicated by the TWT command field.

The accept TWT may indicate that a TWT parameter requested by the TWT request STA is received.

The reject TWT may indicate that the TWT parameter requested by the TWT is not requested by the TWT request STA.

If the TWT command field indicates the accept TWT, the TWT response frame may further include information regarding a first allocated TBTT value in the target wake time field and a listen interval between consecutive TBTTs indicated on the basis of the TWT wake interval mantissa field and the TWT wake interval exponent field.

After the TWT request STA and the TWT response STA finish negotiation, the TWT request STA may maintain the doze state until a timing synchronization function is matched to a next negotiated TBTT. The TWT request STA may transition to the awake state to receive a beacon frame transmitted at negotiated TBTTs.

The TWT request element 200 transmitted by the STA may include only an element ID field 220, a length field 225, a control field 230, and a request type field 235, and subsequent fields may be omitted. Alternatively, if an unsolicited trigger indicator included in an unsolicited trigger field 260 included in the reserved bit 255 of the control field 230 of the TWT request element 200 is set to '1', only a target wake time field 240 of the TWT request element 200 may be omitted in the TWT request element 200 transmitted by the STA or a value of the target wake time field 240 may be set to '0'.

Alternatively, if the unsolicited trigger indicator 260 is set to 1 in the TWT request element 200, only the target wake time field 240 may be omitted among fields included in the TWT request element 200 or the target wake time field 240 may be set to all zero values. Next, a TWT wake interval field 250 of the TWT request element 200 may be determined by considering a QoS pattern of unlink data of the STA. In addition, an STA for receiving a beacon frame from an AP may transmit information regarding a target wake time to the AP by using the TWT request element 200. In addition, if the unsolicited trigger field 260 included in the TWT request element 200 is set to 1 or if a specific field included in the TWT request element 200 is set to a specific value, the target wake time field 240 may include information regarding a specific beacon frame from which the STA transitions to the wake mode and regarding a specific TBTT interval unit thereof in order to receive information regarding a target transmission time of a trigger frame transmitted at a later time.

The unsolicited trigger indicator may indicate whether to receive the trigger frame 210 on the basis of information regarding a target transmission time for the trigger frame 210 configured by the AP.

That is, the unsolicited trigger field 260 may include an unsolicited trigger indicator indicating whether to receive the trigger frame 210 according to the target transmission time configured by the AP. For example, if the unsolicited trigger indicator is a first value, configuration of the target transmission time of the AP may be requested to the AP by considering a TWT parameter configured by the STA. If the unsolicited trigger indicator is a second value, it may be indicated that the STA will conform to the target transmission time based on the TWT parameter configured by the AP.

If the unsolicited trigger indicator is set to 1, the STA may configure a separate TWT parameter and thus does not request for transmission of the trigger frame 210 of the AP by considering the configured TWT parameter. That is, if the unsolicited trigger indicator is set to 1, the STA may perform an operation based on the TWT parameter configured by the AP.

In addition, according to an embodiment of the present invention, the AP may receive the TWT request element 200 from the STA, and the AP may transmit information regarding the target transmission time of the trigger frame 210 by using the TWT response element 205 included in the beacon frame for the STA having uplink (UL) multi-user (MU) transmission capability. If the TWT response element is transmitted in response to the TWT request element 200 transmitted to request for the target transmission time of the trigger frame by the STA, the AP may use the target wake time field 240 of the TWT response element 205 to inform the STA about a specific beacon frame from which the STA receives a beacon frame and a specific TBTT interval (or listen interval) thereof.

Upon receiving the TWT response element 205, the STA may transition to the awake mode to receive information regarding a target transmission time of a trigger frame through a beacon frame in unit of a TBTT interval from a specific beacon frame on the basis of the target wake time field 240. Alternatively, the AP may transmit a TWT response element in which information regarding the target wake time field 240 is omitted. Upon receiving the TWT response element not including the target wake time field 240, the STA may transition to the awake mode to receive information regarding the target transmission time of the trigger frame from the beacon frame transmitted immediately next.

In addition, if 'Unsolicit' is requested to the AP by the STA, the STA may transmit buffer state information through the target wake time field 240 of the TWT request element 200 instead of information regarding the target wake time. For example, information regarding a traffic identifier (TID), buffer state information, queue size information, or the like may be transmitted through 8 octets corresponding to the target wake time field. Upon receiving the TID, the buffer state information, the queue size information, or the like through the target wake time field of the TWT request element, the AP may use TWT wake interval information and buffer information of the STA to transmit a trigger frame for UL MU transmission to the STA.

The element ID field 220 may include identification information for indicating that a transmitted information unit is a TWT element, and the length field 225 may include information regarding a length of the transmitted information unit.

The control field 230 may further include a null data packet (NDP) paging indicator field and a power management (PM) mode field. The NDP paging indicator field may include an NDP paging indicator for indicating whether the NDP paging field is present. The NDP paging field may include information regarding paging for the STA. A responder PM mode field may include information regarding a PM mode.

The TWT wake interval field 250 included in the TWT request element 200 transmitted by the STA may include information regarding an interval between TWTs. The TWT wake interval field 250 may be determined on the basis of a quality of service (QoS) pattern of uplink data of the STA.

In addition, an STA which has received a beacon frame may receive the TWT response element 205 by transitioning to the awake state in unit of a target beacon transmission time (TBTT) (or unit of a TBTT interval) with respect to a beacon frame transmitted after several beacon frames are transmitted by the AP by using the target wake time field 240. The TWT response element 205 may include information regarding a target transmission time of the trigger frame 210. The TBTT may be a transmission interval of the beacon frame transmitted by the AP.

An AP which has received the TWT request element 200 from the STA may transmit information regarding the target transmission time of the trigger frame 210 by using the TWT response element 205 included in the beacon frame for an STA capable of performing UL MU transmission.

In this case, the TWT response element 205 may be transmitted in response to the TWT request element 200 transmitted by the STA to request for the target transmission time of the trigger frame 210, and the TWT response element 205 may include the target wakeup time field 240 and/or the TWT wake interval field 250. The target wakeup time field 240 included in the TWT response element 205 may include information regarding whether the STA receives information regarding the target transmission time of the trigger frame 210 by using a beacon frame transmitted after several beacon frames. In other words, the target wakeup time field 240 may include information regarding a transmission time of the trigger frame 210. The TWT wake interval field 250 may include information regarding an interval in which the STA transitions to the awake state to receive a beacon frame.

An STA which has received the TWT response element 205 may transition to the awake state in unit of a target beacon transmission time (TBTT) interval after a specific beacon frame on the basis of the target wakeup time field 240 and/or the TWT wake interval field 250 to receive the beacon frame, and thus may acquire information regarding the target transmission time of the trigger frame 210. Alternatively, the TWT response element 205 may not include the target wakeup time field 240 (or may omit a value of the target wakeup time field 240). Upon receiving the TWT response element 205 in which the target wakeup time field 240 is not included (or the value of the target wakeup time field 240 is omitted), the STA may acquire information regarding a target transmission time of the trigger frame 210 by transitioning to the awake state in unit of a TBTT interval (or TBTT) from a beacon frame transmitted immediately next.

According to an embodiment of the present invention, if the unsolicited trigger indicator of the unsolicited trigger field 260 included in the TWT request element 200 transmitted by the STA is set to '1', the target wake time field 240 of the TWT request element 200 may transmit buffer state information of the STA instead of information regarding the target wake time. For example, the target wake time field 240 may have a size of 8 octets, and if the unsolicited trigger indicator of the unsolicited trigger field 260 included in the TWT request element 200 is set to '1', the target wake time field 240 of 8 octets may include information corresponding to a traffic identifier (TID), buffer state, queue size, or the like for uplink data to be transmitted by the STA. The TID may include information regarding a characteristic of uplink data buffered in the STA, and the buffer state or queue size information may include information regarding a size of the uplink data buffered in the STA.

The AP may transmit the trigger frame 210 for UL MU transmission of the STA on the basis of STA buffer information received through the target wake time field 240 included in the TWT request element 200 and the TWT interval information received through the TWT wake interval field 240.

For example, the STA may transmit information regarding the TWT pattern (or a TWT parameter for determining TWT) to the AP on the basis of the TWT request element 200. As a pattern of a TWT, a TWT pattern may be determined on the basis of the target wake time field 240, a nominal minimum wake duration field 245, and the TWT wake interval field 250. The STA may set a reserved bit of the request type field of the TWT request element 200 to 1, and may request the AP for a TWT or information regarding the target transmission time of the trigger frame 210.

In addition, when intended to receive information regarding the target transmission time of the trigger frame 210 transmitted through the beacon frame, it may be transmitted by setting a most significant bit (MSB) of the reserved field 255 of the control field 230 of the TWT request element 200 to '1'. The STA may use the remaining 5 bits of the reserved bit of the control field 230 of the TWT request element 200 to transmit information regarding whether to receive information regarding the target transmission time of the trigger frame 210 from the AP by using TWT pattern information determined during several TBTTs.

In addition, the STA may also transmit whether it is intended to receive information regarding the target transmission time of the trigger frame 210 through the TWT request element 200 included in the beacon frame continuously until a TWT teardown request or another TWT request element (or another TWT parameter) is transmitted.

For example, the STA may set the unsolicited trigger field 260 included in the reserved field (or reserved bit) 255 of the control field 230 of the TWT request element 200 to 1 and set the TBTT duration field to 0, and thus may request the AP to transmit information regarding the target transmission time of the trigger frame 210 through a beacon frame continuously until a TWT teardown request or another TWT request element (or another TWT parameter) is transmitted. The TBTT duration field may include information regarding a duration in which information regarding the target transmission information (or the TWT response element 205) of the trigger frame 210 is transmitted.

For another example, the STA may set the unsolicited trigger field 260 of the control field 230 of the TWT request element 200 to 1 and set the TBTT duration to 3, and thus may request the AP to transmit information regarding the target transmission time of the trigger frame 210 through three beacon frames including a next beacon frame.

The AP may know whether to receive a beacon frame including the TWT response element 205 including information regarding the target transmission time of the trigger frame 210 of the STA on the basis of the unsolicited trigger field 260 and TBTT duration field of the TWT request element 200 indicted by the STA, and thus may transmit to the STA the beacon frame including the TWT response element 205 including the information regarding the target transmission time of the trigger frame 210.

According to another embodiment of the present invention, if the STA requests the AP for information regarding a TWT pattern on the basis of the TWT request element, the reserved bit of the request type field 235 may be set to '1'. If the STA requests for a target wakeup time (TWT) or information regarding a target transmission time of a trigger frame, an MSB bit of the control field 230 of the TWT request element 200 may be transmitted by setting the MSB bit of the control field 230 of the TWT request element 200 to '1'. On the basis of subsequent bits (e.g., 5 bits), a specific TBTT interval through which the STA receives information regarding a target transmission time from the AP through may also be informed. For one example, the STA may inform the AP to receive a beacon frame with an interval corresponding to 3-fold of the TBTT interval by setting the unsolicited trigger indicator to '1' and by setting the TBTT interval to '3'. The setting of the TBTT interval to 3 may imply that the STA periodically receives only one of 3 consecutive beacon frames. For another example, the STA may inform that it is intended to receive information regarding the target transmission time of the trigger frame through every beacon frame by setting the unsolicited trigger indicator of the control field of the TWT request element to 1 and by setting the TBTT interval to 1.

Upon receiving the TWT request element, the AP may know whether the STA will receive a certain beacon frame on the basis of the TWT request element transmitted by the STA, and the AP may transmit the target transmission information of the trigger frame for UL MU transmission of the STA through the beacon frame.

In addition, according to an embodiment of the present invention, the STA may request the AP to receive the information regarding the target transmission time of the trigger frame through the beacon frame transmitted during a specific TBTT duration through the TWT request element 200.

The AP may configure a TWT for receiving the trigger frame 210 to the STA through the TWT response element 205 of the beacon frame. The AP may set the TWT for the STA on the basis of the TWT parameter included in the TWT request element 200 transmitted by the STA, and may set the TWT for the STA without consideration of the TWT parameter included in the TWT request element 200 transmitted by the STA.

The AP may report transmission for the target transmission time information of the trigger frame 210 through the beacon frame of the AP on the basis of information regarding a TBTT interval/TBTT duration and an unsolicited trigger field included in the TWT response element 205.

The AP may perform transmission by omitting a specific sub-field of the TWT response element 205 included in the beacon frame. For example, the TWT response element 205 may include only the element ID field 220, the length field 225, the control field 230, and the request type field 235, and may not include subsequent fields.

The AP may also set a TWT for receiving the trigger frame 210 to the STA through the TWT response element 205 when the STA transmits the TWT request element 200 to the AP without setting the unsolicited trigger field 260. In addition, the AP may determine whether to support transmission of an uplink frame based on the unsolicited trigger frame of the STA, and thus may transmit information on the TWT to the STA according to the aforementioned method.

The TWT request element 200 may also be termed as an uplink transmission configuration request element, and the TWT response element 205 may also be termed as an uplink transmission configuration response element. The TWT parameter for configuring the TWT included in the TWT request element 200 may also be termed as an uplink transmission configuration request parameter, and the TWT parameter for configuring the TWT included in the TWT response element 205 may be termed as an uplink transmission configuration response parameter.

According to the aforementioned embodiment of the present invention, although the reserved field of the control field of the TWT element is used, the user of the reserved field is only one example. The aforementioned operation between the STA and the AP may be performed through a TWT element of another format or an information element for transmitting information regarding a target transmission time of a newly defined trigger frame.

For example, a newly defined TWT request element may include a trigger frame indicator. If the trigger frame indicator of the newly defined TWT request element is set to '1', an MSB of a nominal minimum wake duration field of the TWT request element may be used as an indicator indicating whether to support an unsolicited trigger (or an 'Unsolicit' mode). If the MSB of the nominal minimum wake duration field is set to 1 and thus indicates that the unsolicited trigger (or 'Unsolicit' mode) is supported, the remaining bits included in the nominal minimum wake duration field may include information regarding the nominal minimum wake duration. On the contrary, if the MSB of the nominal minimum wake duration field is set to 0 and thus indicates that the unsolicited trigger (or 'Unsolicit' mode) is supported, the remaining bits included in the nominal minimum wake duration field may include information regarding a TBTT duration/TBTT interval.

Alternatively, if the trigger frame indicator is set to 1 and the unsolicited trigger indicator is set to 1, the information regarding the TBTT duration/TBTT interval may be transmitted by using each of the TWT wake interval mantissa field and/or the TWT wake interval exponent field or both of the two fields.

In addition, if 'Unsolicit' is set, it may be configured that a unit of the target wake time or TWT wake interval mantissa field and/or TWT wake interval exponent field indicates a TBTT unit. When such a method is used, a specific field may be omitted in the TWT response element or it may be changed to use a smaller number of bits. Therefore, an overhead of data to be used by the AP to transmit the information for the target transmission time for the trigger frame through the beacon frame may be decreased.

In case of setting the 'Unsolicit' mode in which the information regarding the target transmission time for the trigger frame between the AP and the STA is informed through the beacon frame, the AP may transmit the information regarding the target transmission time for the trigger frame to be allocated for the STA during the TBTT through the beacon frame.

Alternatively, an operation similar to the aforementioned operation may be performed by the STA and the AP by using a triggered indicator and an unsolicited trigger indicator.

For example, the STA may wake up for every TWT wake interval to receive the beacon frame from the AP by setting the triggered bit of the TWT request element to '1' and by setting the unsolicited trigger bit (or response PM mode bit) to '1', and thus may inform to receive the information regarding the target transmission time of the trigger frame. In this case, the TWT wake interval may be set by using at least one of the TWT wake interval mantissa field and the TWT wake interval exponent field. Alternatively, a TBTT interval or listen interval intending to receive the beacon frame by the STA may be expressed on the basis of the TWT wake interval mantissa field and the TWT wake interval exponent. In this case, if the triggered bit is set to '1' and the unsolicited trigger bit (or response PM mode bit) is set to '1', a unit of the TWT wake interval field may be defined as a unit of a beacon interval.

Upon receiving the TWT request element, the AP may respond for the TWT request requested by the STA through the TWT response element. If the AP supports an unsolicited trigger method for the STA, the AP may perform transmission by setting the triggered bit to 1 and by setting the unsolicited trigger bit (or response PM mode bit) to 1. In this case, the AP may transmit information regarding a transmission time of a beacon frame for starting the unsolicited trigger method for the STA through the target wake time field of the TWT response element, and may transmit interval information of the beacon frame for transmitting the target transmission time of the trigger frame for the STA through the TWT wake interval field of the TWT response element.

Upon receiving the TWT response element, the STA may receive a beacon frame transmitted at specific TBTT on the basis of a target wake time field/TWT wake interval field according to the information included in the TWT response element. Thereafter, the STA may transition to an awake mode to receive a beacon frame at a transmission time (or TBTT) of a beacon frame including information regarding a target transmission time of a trigger frame transmitted by the AP. As such, the information regarding the target transmission time of the trigger frame transmitted by the AP to the STA may be transmitted through the beacon frame.

In the aforementioned embodiment, a reserved bit of a control field is disclosed as a triggered indicator (or triggered bit) and an unsolicited trigger indicator. Such an embodiment is only one example, and thus a response PM mode bit, a reserved bit of a request type field, or a bit of another field may be reused as a triggered indicator (or triggered bit) and an unsolicited trigger indicator.

In addition, a command type indicated by the TWT configuration command field included in the request type field of the TWT response element according to an embodiment of the present invention may be TWT grouping, accept TWT, alternative TWT, or the like. In particular, if the command type indicated by the TWT configuration command field is the TWT grouping, the TWT response element may include not only information for grouping to allow a plurality of STAs operating in a power saving mode to operate in an 'Unsolicit' mode as one group but also information regarding a transmission time of a start beacon frame in which the plurality of STAs operating in the power saving mode must perform monitoring and information regarding a transmission interval of another beacon frame transmitted on the basis of the start beacon frame. The transmission interval of the beacon frame may be set to be the same as a reception interval of the STA.

Figure 3:
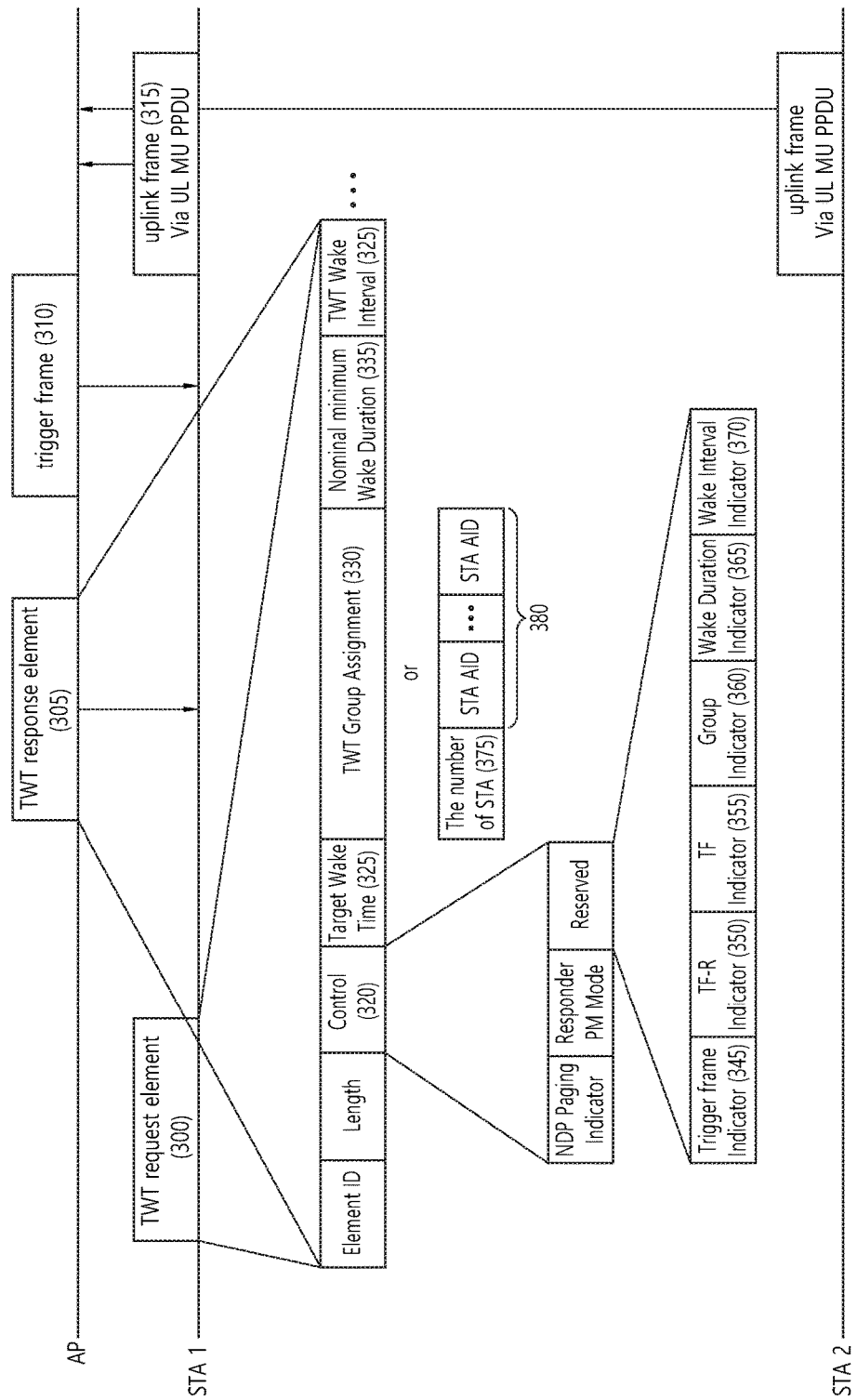
FIG. 3 is a concept view illustrating a trigger method of UL MU transmission according to an embodiment of the present invention.

FIG. 3 is a concept view illustrating a trigger method of UL MU transmission according to an embodiment of the present invention.

A method described in FIG. 3 is a method of requesting for information regarding a target transmission time of a trigger frame on the basis of a TWT element of a different format, and receiving information regarding a target transmission time. In FIG. 3, information included in each field included in a TWT element is primarily disclosed when a TWT element is the TWT response element.

Referring to FIG. 3, a reserved field of a control field 320 of a TWT request element 300 may include a trigger frame indicator field 345, a trigger frame-random access (TF-R) indicator field 350, a TF indicator field (or TF-scheduled (S) indicator field) 355, a group indicator field 360, a wake duration indicator field 365, and a wake interval indicator field 370.

The trigger frame indicator field 345 may include a trigger frame indicator indicating that information transmitted by using the TWT element is information related to transmission of a trigger frame. For example, if the trigger frame indicator is 1, it may be indicated that information transmitted by using the TWT element is information related to transmission of the trigger frame, and a field included in the TWT element is used as a predefined format to deliver information related to transmission of a predetermined trigger frame.

The TF-R indicator field 350 may include a TF-R indicator for indicating whether a trigger frame for random access is transmitted at a time indicated by a trigger target wake time field included in a TWT response element transmitted by the AP. If the TF-T indicator is set to 1, it may be indicated that a trigger frame 310 for random access is transmitted at a target wake time indicated by a target wake time field 325. On the contrary, if the TF-R indicator is set to 0, it may be indicated that the trigger frame 310 for random access is not transmitted at a target wake time indicated by the target wake time field 325.

It may be determined that an unassociated STA or associated STA intending to perform random access according to the TF-R indicator included in the TWT response element 305 transmitted by the AP will transition to an awake state to receive the trigger frame 310 at a target wake time.

If a specific value predetermined for an STA association identifier (AID) or group ID included in a TWT group allocation field 330 included in the TWT element indicates transmission of a trigger frame for random access (or if it indicates transmission of the trigger frame 310 allocated for a plurality of STAs (or STA group) or a target wake time at which the trigger frame 310 is transmitted), the TF-R indicator field 350 may be omitted. For example, if both of the STA AID and the group ID are 0, transmission of the trigger frame 300 for random access may be indicated, and the TF-R indicator field 350 may be omitted.

The TF indicator field (or TF-scheduled (S) indicator field) 355 may include a TF indicator (or TF-S indicator) indicating whether the trigger frame 310 for scheduled access is transmitted at a target wake time included in the TWT response element 305 transmitted by the AP. The scheduled access may indicate uplink transmission of only at least one STA scheduled by the AP.

For example, if the TF indicator is set to 1, transmission of the trigger frame 310 for the scheduled access of the STA may be indicated at the target wake time, and on the contrary, if the TF indicator is set to 0, it may be indicated that the trigger frame 310 for scheduled access is not transmitted at the target wake time.

If the TF-R indicator is separately transmitted and if the trigger frame 310 for a scheduled access is not transmitted at the target wake time, transmission of STA ID/group ID related fields 375 and 380, nominal minimum wake duration field 335, and TWT wake interval field 340 which are field subsequent to the target wake time field 325 may be omitted.

The group indicator field 360 may include a group indicator indicating whether an STA for receiving the trigger frame 310 is indicated by individual identification information (AID, partial association identifier (PAID), or MAC address) or by group-based identification information (group identifier). For example, if the group identifier is '1', a group of STAs for receiving a trigger frame may be indicated on the basis of the group ID, and if the group identifier is '0', the STA for receiving the trigger frame may be indicated on the basis of the individual STA ID (AID, PAID, MAC address, etc.).

The wake duration indicator field 365 may include a wake duration indicator indicating whether a duration for maintaining the awake state is set to the STA by transitioning to the awake state at the target transmission time indicated by the target wake time field.

For example, if the wake duration indicator is set to '1', the AP may set a duration for maintaining the awake state to the STA after the STA transitions to the awake state at the target transmission time on the basis of a nominal minimum wake duration field 335 included in a TWT response element 305. The STA may know whether the nominal minimum wake duration field 335 is omitted in the TWT response element 305 transmitted by the AP on the basis of the wake duration indicator. Specifically, if the wake duration indicator is 1, the nominal minimum wake duration field 335 may be included in the TWT response element 305, and if the wake duration indicator is 0, the nominal minimum wake duration field 335 may not be included in the TWT response element 305. If the wake duration indicator of the TWT response element 305 transmitted by the AP is set to 1, the STA may maintain the awake state to receive the trigger frame 310 during a duration indicated on the basis of the nominal minimum wake duration field 335. If the trigger frame 310 is not transmitted during the duration indicated on the basis of the nominal minimum wake duration field 335, the STA may transition from the awake state to the doze state when the duration is terminated. Even if the trigger frame 310 is transmitted during the duration indicated on the basis of the nominal minimum wake duration field 335, the STA may transition from the awake state to the doze state when the duration is terminated.

If the AP does not separately transmit information regarding the duration for maintaining the awake state, the STA may monitor the trigger frame 310 by maintaining the awake state during a predefined (or configured) duration, and if the duration is terminated without receiving the trigger frame 310, may transition to the doze state.

The wake interval indicator field 370 may include a wake interval indicator indicating whether an interval for transitioning to the awake state of the STA for receiving the trigger frame transmitted by the AP is configured. For example, the AP may periodically transmit the trigger frame 310 to the STA. The STA may receive the trigger frame 310 at a first target transmission time, and thereafter may periodically transition to the awake state to monitor transmission of the trigger frame 310. For this, the AP may configure a wake interval for receiving the trigger frame 310 of the STA. A wake interval indicator may indicate whether the wake interval is configured by the AP.

Each of the target wake time field 325, the TWT group allocation field 330, the STA count field 375, the STA AID field 380, and nominal minimum wake duration field 335, the TWT wake interval field 340, or the like located after the control field 320 of the TWT element may include a plurality of sub-fields to include individual information for each of the plurality of STAs. For example, if the trigger frame is transmitted to an STA1, an STA2, and an STA3, the target wake time field 325 may include information regarding a target wake time for the STA1, a target wake time for the STA2, and a target wake time for the STA3.

The target wake time field 325 may include information regarding a target transmission time of the trigger frame 310. A time unit for counting the target wake time may be predetermined. Information on the determined time unit may be known in advance to the STA or may be received in advance by the STA.

The TWT group allocation field 330 may include information regarding an STA group for receiving the trigger frame on the basis of TWT (or for operating based on the same TWT). A plurality of STAs included in the STA group indicated by the TWT group allocation field 330 may transition to the awake stat to receive the trigger frame 310 from the AP at a time indicated by the target wake time field 325.

If a group ID included in the TWT group allocation field 330 is a specific value (e.g., 0), all STAs may transition to the awake mode at a target transmission time to receive the trigger frame 310.

The trigger frame 310 transmitted more dynamically to the STA may be scheduled on the basis of the STA count information field 375 and the STA AID field 380 instead of the TWT group allocation field 330. The STA count information field 375 may include information regarding the number of STAs for receiving the trigger frame 310 scheduled at a target transmission time, and the STA AID field 380 may include information regarding an identifier of an STA for receiving the trigger frame 310 at the target transmission time.

The nominal minimum wake duration field 335 may include information regarding a time during which the STA transitioned to the awake state maintains the awake state to receive the trigger frame 310 at the target transmission time. The STA transitioned to the awake state at the target transmission time may monitor the trigger frame 310 while maintaining the awake state during a duration configured by the nominal minimum wake duration field 335 of the AP. The STA may receive the trigger frame 310 during the configured duration, may transmit the uplink frame 315 including buffered unlink data in response to the trigger frame 310 through a UL MU PPDU (or on a UL MU PPDU), may receive an acknowledgement (ACK) frame from the AP, and may transition to a doze state after the configured duration. If the configured duration is terminated, the STA may transition to the doze state without transmission of the UL MU PPDU even if the trigger frame 310 is received.

If the trigger frame 310 is not received during the configured duration, the STA may transition to the doze state after the determined duration. Alternatively, the STA may receive the trigger frame 310 during the configured duration, and if there is no buffered uplink data, may transmit to the AP an uplink frame 315 in which an additional data bit is set to 0 or a power management (PM) bit is set to 1. If the AP transmits an ACK frame for the uplink frame 315, the STA may transition to the doze state even if the configured time is not over.

The TWT wake interval field 340 may include information regarding an interval for transitioning to the awake state of the STA for receiving the trigger frame. The STA may receive the trigger frame 310 by transitioning to the awake state on the basis of information included in the target wake time field 325 and the TWT wake interval field 340.

Although the TWT element disclosed in FIG. 3 does not include the request type field, this is for exemplary purposes only. That is, a request type field may be additionally included in the TWT element. The request type field included in the TWT element may include a TWT flow indicator, and the TWT flow indicator may be included when a plurality of pieces of TWT-related information are generated. In addition, a length field may be used to transmit information regarding a target transmission time for transmission of a plurality of trigger frames.

Figure 4:
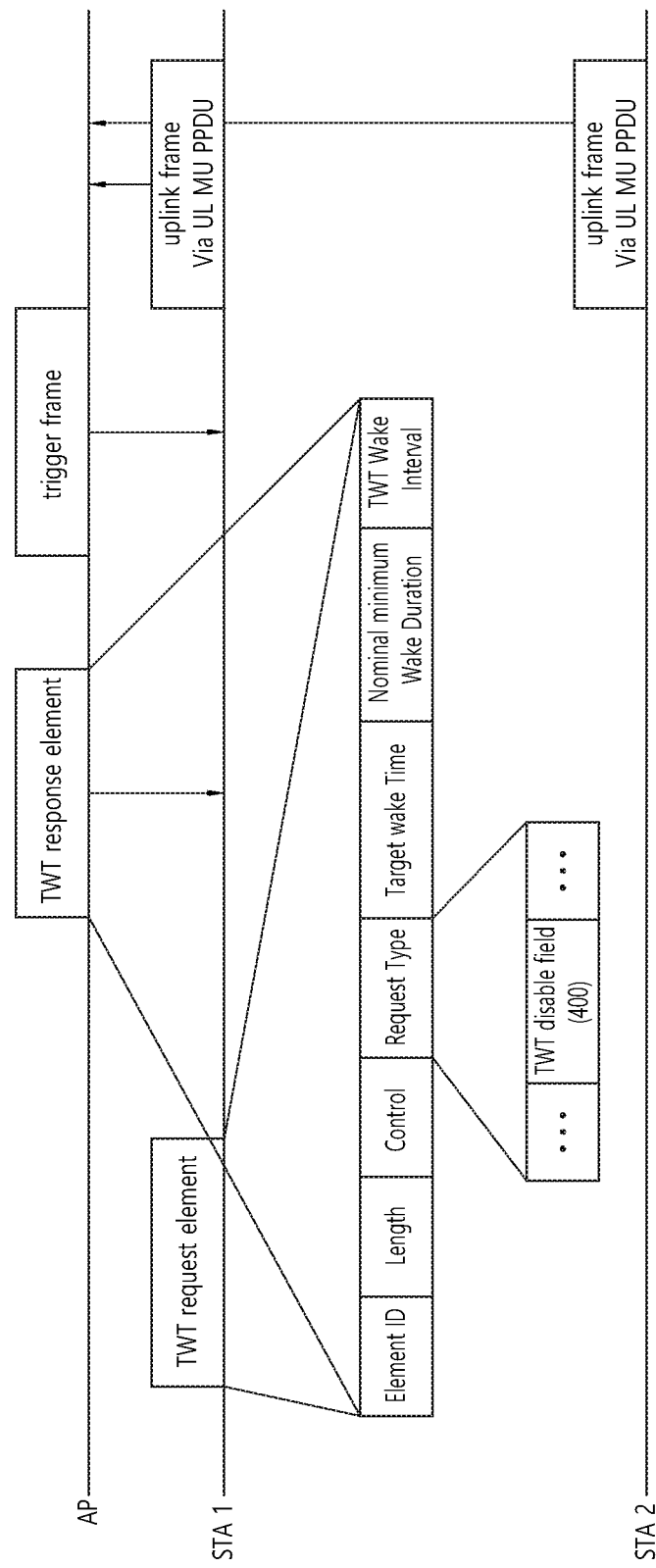
FIG. 4 is a concept view illustrating a trigger method of UL MU transmission according to an embodiment of the present invention.

FIG. 4 is a concept view illustrating a trigger method of UL MU transmission according to an embodiment of the present invention.

A method in which an STA requests for information regarding a target transmission time of a trigger frame on the basis of a new information element, and an AP receives the information regarding the target transmission time is described in FIG. 4.

Referring to FIG. 4, the STA may transmit a TWT request element together when transmitting buffer state information.

A TWT configuration frame (or additional control frame) may include the buffer state information and the TWT request element.

The STA may teardown (or disable) a predetermined TWT through the TWT request element while transmitting the buffer state information. For example, the STA for transmitting the TWT request element for the trigger frame may request for disabling of a TWT determined for a current STA on the basis of a reserved bit or the like of a control field or a TWT protection field included in the TWT request element.

An AP requested to be disabled from the STA may report to the STA that the TWT predetermined for the STA is disabled on the basis of the reserved bit of the control field or the TWT protection field of the TWT response element transmitted to transmit the target transmission time information for transmission of the trigger frame and the reserved bit or the like of the request type field of the TWT response element.

Alternatively, an indicator for indicating the disabling of the TWT may be additionally defined. For example, the STA may request the AP to disable the TWT determined for the STA by setting a TWT disable bit (or a TWT disable indicator field 400) of the TWT request element to '1' while transmitting the buffer state information. Upon receiving the TWT request element in which the TWT disable bit is set to '1', the AP may determine to disable the TWT configured for the STA, and stop transmission of a trigger frame scheduled to be transmitted to the STA without having to configure the TWT scheduled to be configured for the STA.

On the contrary, the STA may request the AP to enable the TWT by setting the TWT disable bit of the TWT request element to '0' while transmitting the buffer state information. Upon receiving the TWT request element in which the TWT disable bit is set to '0', the AP may maintain the enabling of the TWT configured for the STA, and may transmit a trigger frame to the STA by configuring the TWT for the STA. In addition, the AP may additionally allocate the TWT requested by the TWT request element to the STA.

A TWT flow identifier may be configured between the plurality of STAs and the AP to enable/disable the TWT multiple times. In this case, the STA or the AP may enable/disable a specific TWT flow for a specific STA on the basis of the TWT flow identifier.

For example, in order to configure a first TWT flow, the STA may transmit to an access point (AP) a first uplink transmission configuration request element including information for the request of the target transmission time of the trigger frame. The STA may receive from the AP a first uplink transmission configuration response element including the information regarding the target transmission time in response to the first uplink transmission configuration request element.

Thereafter, the STA may transition from the doze state to the awake state on the basis of the target transmission time to receive the trigger frame from the AP, and the STA may be triggered by the trigger frame to transmit an uplink frame. In this case, the uplink frame may be trigged by the trigger frame and may be transmitted on the basis of UL MU transmission through different frequency resources on a time resource overlapping with another uplink frame transmitted by another STA.

In addition, to configure a second TWT flow, the STA may transmit to the AP a second uplink transmission configuration request element for the request of a second target transmission time of a second trigger frame. The STA may receive from the AP a second uplink transmission configuration response element including information on the second target transmission time in response to the second uplink transmission configuration element.

Thereafter, the STA may transition from the doze state to the awake state to receive the second trigger frame on the basis of the second target transmission time, and the STA may be triggered by the second trigger frame to transmit the second uplink frame.

In this case, the first trigger frame and the second trigger frame may be transmitted within one beacon frame interval, and thus the first TWT flow and the second TWT flow may be performed within one beacon frame transmission interval.

In addition, when the STA performs a buffer state report (including transmission of TSPEC information), upon negotiating an 'Unsolicit' mode with the AP, the STA may change a TBTT interval/TBTT duration according to quality of service (QoS) of uplink data. For this, the STA may additionally transmit information regarding whether the STA supports the 'Unsolicit' mode in a frame for performing the buffer state report and TBTT interval/duration information to be changed. In this case, index information corresponding to the TBTT interval/duration information may be pre-defined, and the STA may report a change in the TBTT interval/duration to the AP through the index information instead of the TBTT interval/duration information to be changed. Upon receiving the buffer state report from the STA, the AP may use an ACK/block ACK frame for transmitting a response to the buffer state report for the purpose of confirming the TBTT interval of which a change is requested by the STA. Alternatively, upon receiving the buffer state report from the STA, the AP may transmit information regarding the TBTT interval/duration changed by the AP. For example, if the AP receives the buffer state report and TBTT interval/duration change information in the 'Unsolicit' mode from the STA, the AP may transmit change information regarding the TBTT interval to the STA by using a reserved bit of a BA control field.

Figure 5:
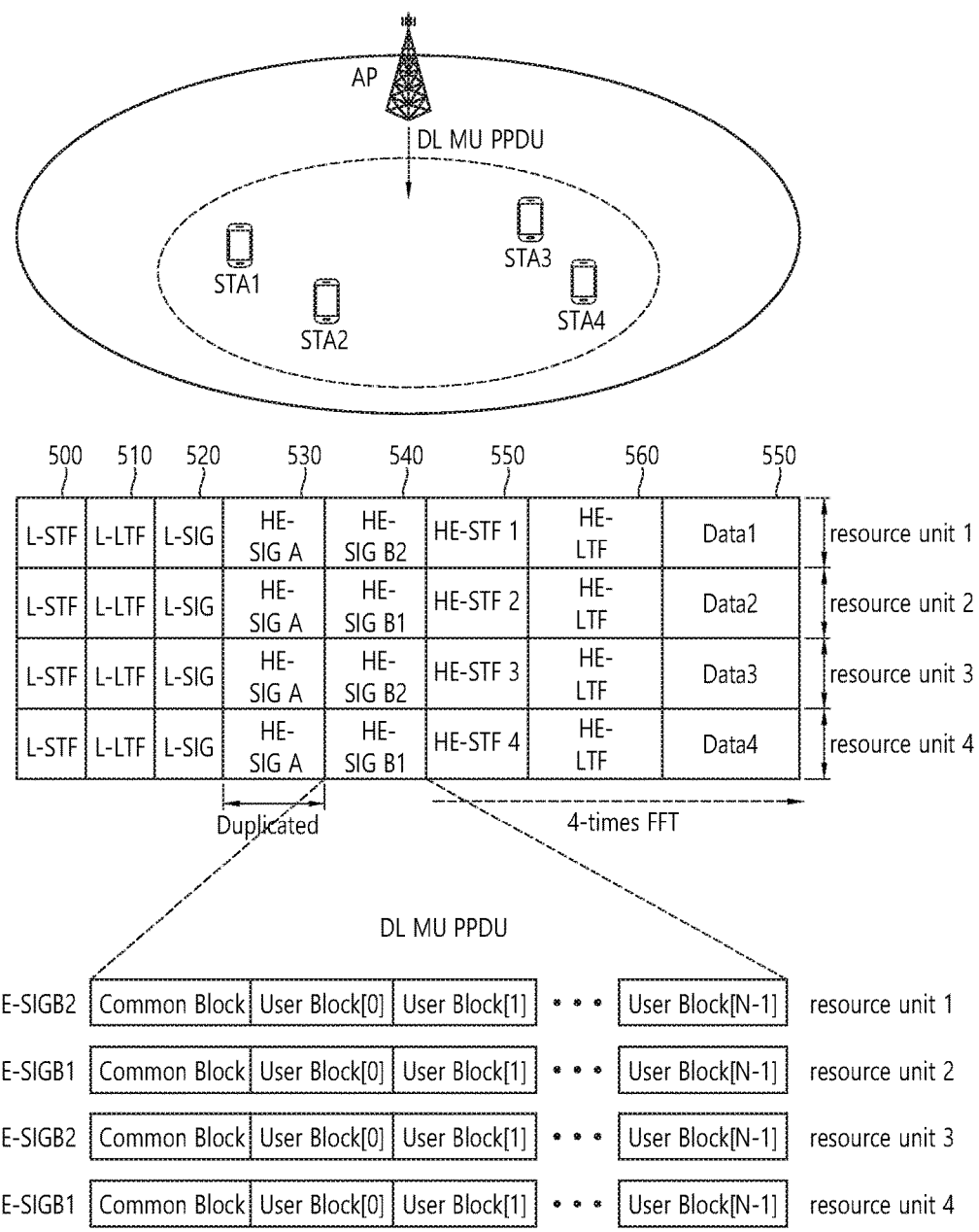
FIG. 5 is a conceptual view illustrating a downlink (DL) MU physical layer (PHY) protocol data unit (PPDU) format according to an embodiment of the present invention.

FIG. 5 is a conceptual view illustrating a DL MU PPDU format according to an embodiment of the present invention.

In FIG. 5, a DL MU PPDU format transmitted based on OFDMA by an AP is disclosed according to the embodiment of the present invention. A TWT response element may be transmitted to a plurality of STAs through a data field of the DL MU PPDU format. The AP may transmit a plurality of TWT response elements to the plurality of STAs through one DL MU PPDU.

Referring to an upper portion of FIG. 5, a PHY header of a DL MU PPDU may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), and a data field (or a MAC payload). The PHY header may be divided into a legacy part before the L-SIG and a high efficiency (HE) part after the L-SIG.

An L-STF 500 may include a short training orthogonal frequency division multiplexing (OFDM) symbol. The L-STF 500 may be used for frame detection, automatic gain control (AGC), diversity detection, and coarse frequency/time synchronization.

An L-LTF 510 may include a long training OFDM symbol. The L-LTE 510 may be used for fine frequency/time synchronization and channel prediction.

An L-SIG 520 may be used to transmit control information. The L-SIG 520 may include information for a data rate and a data length.

An HE-SIG A 530 may include information for indicating an STA for receiving a DL MU PPDU. For example, the HE-SIG A 530 may include an identifier of a specific STA (or AP) for receiving the PPDU and information for indicating a group of the specific STA. Further, if the DL MU PPDU is transmitted based on orthogonal frequency division multiple access (OFDMA) or multiple input multiple output (MIMO), the HE-SIG A 530 may also include resource allocation information for receiving the DL MU PPDU of the STA.

Further, the HE-SIG A 530 may include color bits information for BSS identification, bandwidth information, a tail bit, a CRC bit, modulation and coding scheme (MCS) information for an HE-SIG B 540, symbol count information for the HE-SIG B 540, and cyclic prefix (CP) (or guard interval (GI)) length information.

In addition, the HE-SIG B 530 may have a repetition mode for extending a transmission range. If the repetitive mode is used in the HE-SIG A 530, it may be indicated to use the repetitive mode prior to the HE-SIG A 530. The HE-SIG A 530 may be repeated one time in the repetition mode. A bit inter-leaver may be bypassed in a repeated HE-SIG A symbol.

The HE-SIG B 540 may include a length of physical layer service data unit (PSDU) for each STA, information regarding modulation and coding scheme (MCS), a tail bit, or the like. Further, the HE-SIG B 540 may include information for the STA for receiving the PPDU and OFDMA-based resource allocation information (or MU-MIMO information). If the OFDMA-based resource allocation (or MU-MIMO related information) is included in the HE-SIG B 540, resource allocation information may not be included in the HE-SIG A 530.

A field prior to the HE-SIG B 540 on the DL MU PPDU may be transmitted in a duplicated form in each of different transmission resources. In case of the HE-SIG B 540, the HE-SIG B 540 transmitted in some subchannels (e.g., subchannel 1, subchannel 2) may be an independent field containing individual information, and the HE-SIG B 540 transmitted in the remaining subchannels (e.g., subchannel 3, subchannel 4) may have a format in which the HE-SIG B 540 transmitted in other subchannels (e.g., subchannel 1, subchannel 2)) is duplicated.

Specifically, the HE-SIG B 540 may include a common block and a plurality of user blocks. The common block may include information regarding resource allocation, and the user block may include specific information for each STA (or user specific information). A separate CRC may be defined for the common block, and a separate CTC may be defined for each of a predetermined number of the plurality of user blocks. For example, it may be assumed that the HE-SIG B 740 includes one common block and five user blocks (a user block 1 to a user block 5), and a CRC for a user block is defined in unit of two user blocks. In this case, a CRC1 for a common block, a CRC2 for a user block 1 and a user block 2, a CRC3 for a user block 3 and a user block 4, and a CRC4 for a user block 5 may be included in the HE-SIG B.

Each of a plurality of user blocks included in the HE-SIG B 540 transmitted in one resource unit may include information regarding a plurality of users. For example, the user block 1 may include user specific information for an STA1 and an STA2, and the user block 2 may include user specific information for an STA3 and an STA4.

HE SIG B1 transmitted in a resource unit 1 and HE SIG B2 transmitted in a resource unit 2 may be HE SIG B including different information. For example, the HE SIG B1 transmitted in the resource unit 1 may include a common block and user block for the STA1 and the STA2, and the HE SIG B2 transmitted in the resource unit 2 may include a common block and user block for the STA3 and the STA4. As described above, the HE SIG B1 transmitted in the resource unit 3 may be generated by duplicating the HE SIG B1 transmitted in the resource unit 1, and the HE SIG B2 transmitted in the resource unit 4 may be generated by duplicating the HE SIG B2 transmitted in the resource unit 1.

The HE-STF 550 may be used to improve automatic gain control estimation in an MIMO environment or an OFDMA environment.

More specifically, the STA1 may receive an HE-STF1 transmitted through a resource unit1 from the AP, and may decode a data field1 by performing synchronization, channel tracking/prediction, and AGC. Similarly, the STA2 may receive an HE-STF2 transmitted through a resource unit2 from the AP, and may decode a data field2 by performing synchronization, channel tracking/prediction, and AGC. The STA3 may receive an HE-STF3 transmitted through a resource unit3 from the AP, and may decode a data field3 by performing synchronization, channel tracking/prediction, and AGC. The STA4 may receive an HE-STF4 transmitted through a resource unit4 from the AP, and may decode a data field4 by performing synchronization, channel tracking/prediction, and AGC.

The HE-LTF 560 may be used to estimate a channel in the MIMO environment or the OFDMA environment.

A size of IFFT applied to the HE-STF 550 and a field next to the HE-STF 550 may be different from a size of IFFT applied to a field prior to the HE-STF 550. For example, the size of IFFT applied to the HE-STF 550 and the field next to the HE-STF 550 may be four times greater than the size of IFFT applied to the field prior to the HE-STF 550. The STA may receive the HE-SIG A 530, and may be instructed to receive a downlink PPDU on the basis of the HE-SIG A 530. In this case, the STA may perform decoding on the HE-STF 550 and the field next to the HE-STF 550 on the basis of a changed FFT size. On the contrary, if the STA is not instructed to receive the downlink PPDU on the basis of the HE-SIG A 530, the STA may stop decoding and may configure a network allocation vector (NAV). A cyclic prefix (CP) of the HE-STF 550 may have a size greater than a CP of another field, and for this CP duration, the STA may perform decoding on the downlink PPDU by changing the FFT size.

An access point (AP) may allocate a plurality of wireless resources for a plurality of stations (STAs) respectively on a full bandwidth, and may transmit a physical protocol data unit (PPDU) to each of the plurality of STAs through each of the plurality of wireless resources. Allocation information of the plurality of wireless resources respectively for the plurality of STAs may be included in the HE-SIG A 550 or the HE-SIG B 560 as described above.

Figure 6:
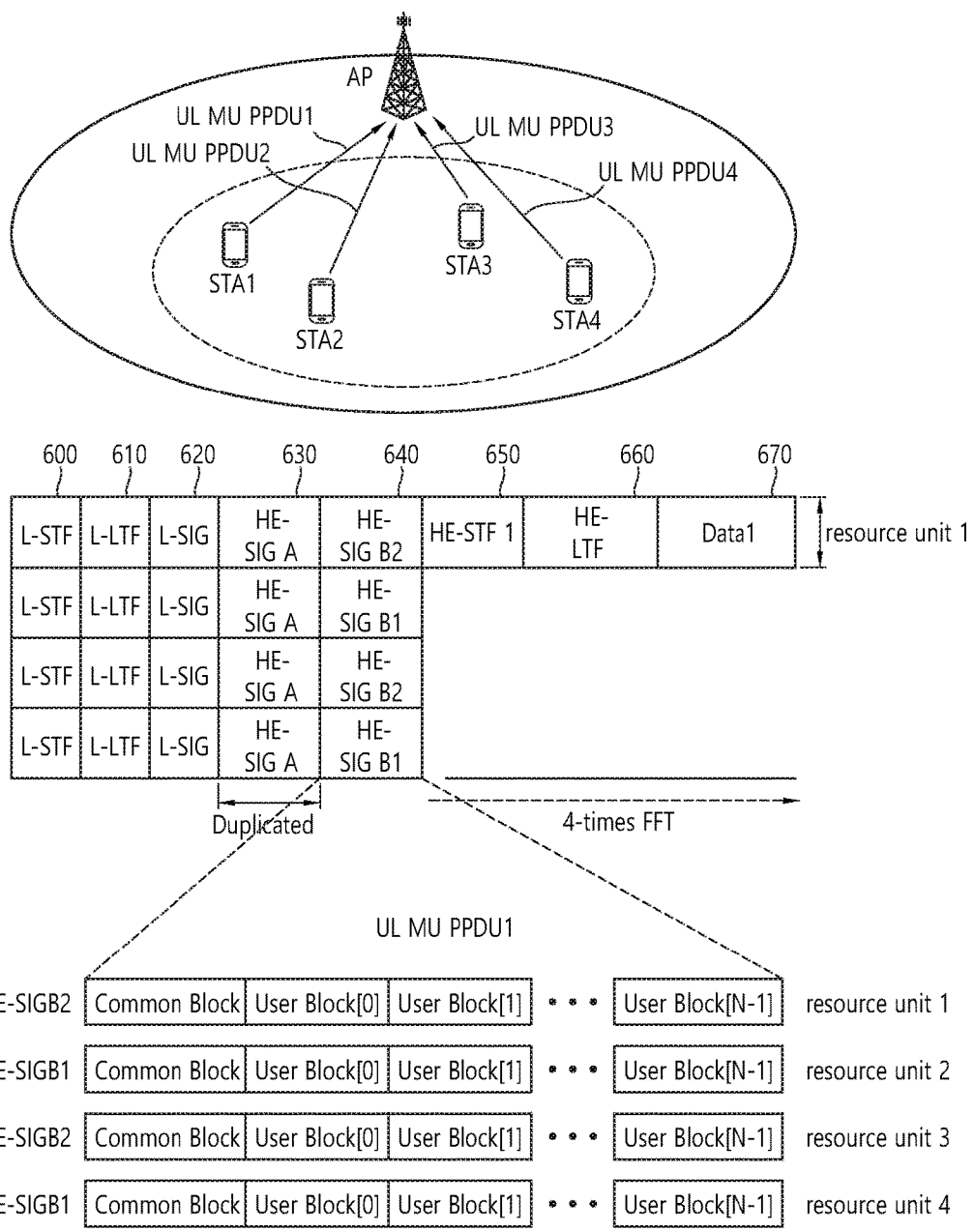
FIG. 6 is a conceptual view illustrating transmission of a UL MU PPDU according to an embodiment of the present invention.

FIG. 6 is a conceptual view illustrating transmission of a UL MU PPDU according to an embodiment of the present invention.

Referring to FIG. 6, a plurality of STAs may transmit the UL MU PPDU on the basis of UL MU OFDMA to an AP. A data field 670 of the UL MU PPDU may include uplink data (or an uplink frame) triggered by a trigger frame. The AP may receive the plurality of uplink frames transmitted by the plurality of STAs through the plurality of UL MU PPDUs transmitted on an overlapped time resource.

An L-STF 600, an L-LTF 610, an L-SIG 620, an HE-SIG A 630, and an HE-SIG B 640 may perform the function disclosed in FIG. 5. Information included in a signal field (the L-SIG 620, the HE-SIG A 630, and the HE-SIG B 640) may be generated based on information included in a signal field of a received DL MU PPDU.

The STA1 may perform uplink transmission through a full bandwidth until the HE-SIG B 640, and may perform uplink transmission through an allocated bandwidth starting from an HE-STF 650. The STA1 may deliver an uplink frame on the basis of a UL MU PPDU through an allocated bandwidth (e.g., a resource unit1). An AP may allocate an uplink resource of each of a plurality of STAs on the basis of the DL MU PPDU (e.g., HE-SIG A/B). Upon allocating the uplink resource, each of the plurality of STAs may transmit the UL MU PPDU.

Figure 7:
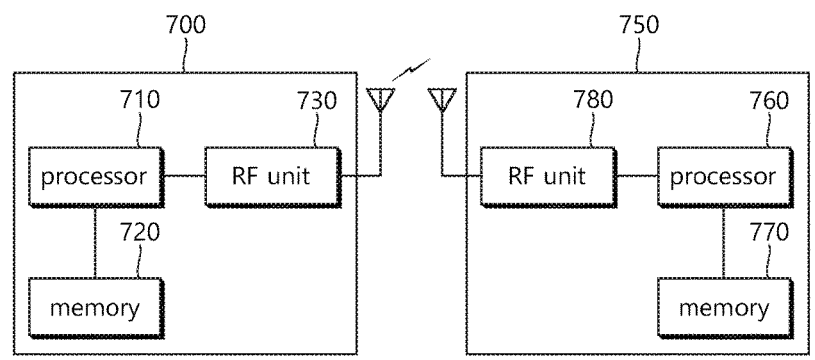
FIG. 7 is a block view illustrating a wireless device to which the exemplary embodiment of the present invention can be applied.

FIG. 7 is a block view illustrating a wireless device to which the exemplary embodiment of the present invention can be applied.

Referring to FIG. 7, as an STA that can implement the above-described exemplary embodiment, the wireless device may correspond to an AP 700 or a non-AP station (STA) 750.

The AP 700 includes a processor 710, a memory 720, and a radio frequency (RF) unit 730.

The RF unit 730 is connected to the processor 710, thereby being capable of transmitting and/or receiving radio signals.

The processor 710 implements the functions, processes, and/or methods proposed in the present invention. For example, the processor 710 may be implemented to perform an operation of the AP according to the aforementioned embodiment of the present invention. The processor may perform the operation of the AP disclosed in the embodiment of FIG. 1 to FIG. 6.

For example, the processor 710 may be implemented to receive an uplink transmission configuration request element (TWT request element) from the plurality of STAs and to transmit an uplink transmission configuration response element (TWT response element) for reporting a target transmission time of a trigger frame to the plurality of STAs.

In addition, the processor 710 may determine an uplink transmission configuration response parameter (or TWT parameter) included in the uplink transmission configuration response element by considering an uplink transmission configuration request parameter (or TWT parameter) included in the uplink transmission configuration request element from the plurality of STAs. In addition, the processor 710 may be implemented to receive a plurality of uplink frames triggered on the basis of the trigger frame.

In addition, the processor 710 may be implemented to receive a TWT request element from the STA and to transmit a TWT response element including information regarding a target wake time in response to the TWT request element.

The TWT response element may further include a wake interval field. The wake interval field may include information regarding an interval of a target wake time at which the STA transitioned to the doze state transitions back to an awake state to receive another beacon frame to be transmitted after the beacon frame.

The TWT response element may further include a TWT wake interval mantissa field and a TWT wake interval exponent field. The interval may be determined on the basis of the TWT wake interval mantissa and the TWT wake interval exponent field.

The non-AP STA 750 includes a processor 760, a memory 770, and a radio frequency (RF) unit 780.

The RF unit 780 is connected to the processor 760, thereby being capable of transmitting and/or receiving radio signals.

The processor 760 implements the functions, processes, and/or methods proposed in the present invention. For example, the processor 760 may be implemented to perform an operation of the STA according to the aforementioned embodiment of the present invention. The processor may perform the operation of the STA disclosed in the embodiment of FIG. 1 to FIG. 6.

For example, the processor 760 may be implemented to transmit to the AP an uplink transmission configuration request element (or TWT request element) including information for the request of a target transmission time of the trigger frame, and to receive from the AP an uplink transmission configuration response element (or TWT response element) including information regarding a target transmission time in response to the uplink transmission configuration request element.

The processor 760 may be implemented to transition from the doze state to the awake state on the basis of the target transmission time to receive the trigger frame from the AP, and to be triggered by the trigger frame to transmit an uplink frame. The uplink frame may be trigged by the trigger frame and may be transmitted on a UL MU PPDU on the basis of UL MU transmission through different frequency resources on a time resource overlapping with another uplink frame transmitted by another STA.

The uplink transmission configuration request element may further include an unsolicited trigger field and a duration field. The unsolicited trigger field may include an unsolicited trigger indicator indicating whether to receive a trigger frame according to a target transmission time configured by the AP. The duration field may include information regarding a duration of receiving an uplink transmission configuration response element of the STA.

The uplink transmission configuration response element may further include a minimum wake duration field and a wake interval field. The minimum wake duration field may include a minimum duration in which the STA maintains the awake state. The wake interval field may include information regarding a transition interval during which the STA transitioned to the doze state after the minimum duration transitions back to the awake state to receive another trigger frame to be transmitted after the trigger frame.

In addition, the processor 760 may be implemented to transmit to the AP another uplink transmission configuration request element including information for the request of another target transmission time of another trigger frame in order to configure a plurality of TWT flows, and to receive another uplink transmission configuration response element including information regarding another target transmission time in response to another transmission configuration request element.

In addition, the processor 760 may be implemented to transition from the doze state to the awake state on the basis of another target transmission time to receive from the AP, and to be triggered by another trigger frame to transmit another uplink frame. Another uplink frame may be triggered by another rigger frame and thus may be transmitted on a UL MU PPDU on the basis of UL MU transmission through different frequency resources on a time resource overlapping with another uplink frame transmitted by the STA.

In addition, the processor 760 may be implemented to transmit a TWT request element to the AP, receive a TWT response element including information regarding a target wake time from the AP in response to the TWT request element, receive a beacon frame from the AP by transitioning from the doze state to the awake state on the basis of the target wake time, receive a trigger frame from the AP on the basis of TWT information of the beacon frame, and transmit an uplink frame to the AP by using the UL MU transmission on the basis of the trigger frame. In this case, the TWT information may include information regarding transmission of the trigger frame transmitted after the beacon frame.

The TWT response element may further include a wake interval field. The wake interval field may include information regarding an interval of the target wake time at which the STA transitioned to the doze state transitions back to the awake state to receive another beacon frame to be transmitted after the beacon frame.

The TWT response element may further include a TWT wake interval mantissa field and a TWT wake interval exponent field. The interval may be determined on the basis of the TWT wake interval mantissa and the TWT wake interval exponent field.

The TWT request element may include a request target wake time field and a request wake interval field to determine the target wake time with respect to the AP. The request target wake time field may include information regarding a target wake time requested by the STA. The request wake interval field may include information regarding an interval of the target wake time requested by the STA.

The processor 710 and 760 may include an application-specific integrated circuit (ASIC), another chip set, a logical circuit, a data processing device, and/or a converter converting a baseband signal and a radio signal to and from one another. The memory 720 and 770 may include a read-only memory (ROM), a random access memory (RAM), a flash memory, a memory card, a storage medium, and/or another storage device. The RF unit 730 and 780 may include one or more antennas transmitting and/or receiving radio signals.

When the exemplary embodiment is implemented as software, the above-described method may be implemented as a module (process, function, and so on) performing the above-described functions. The module may be stored in the memory 720 and 770 and may be executed by the processor 710 and 760. The memory 720 and 770 may be located inside or outside of the processor 710 and 760 and may be connected to the processor 710 and 760 through a diversity of well-known means.

What is claimed is:

1. A method for uplink (UL) multi-user (MU) transmission of a station (STA) operating in a power save mode in a wireless local area network (WLAN), the method comprising:

transmitting, to an access point (AP) by the STA in an awake state based on the power save mode, a target wakeup time (TWT) request element including first information related to a requested target beacon transmission time (TBTT) of a first beacon frame and second information related to a requested wake interval between subsequent beacon frames the STA intends to receive;

receiving, from the AP by the STA in the awake state, a TWT response element in response to the TWT request element, wherein the TWT response element includes third information related to an allocated TBTT of the first beacon frame and fourth information related to an allocated wake interval between the subsequent beacon frames;

switching, by the STA, to a doze state from the awake state after receiving the TWT response element;

switching, by the STA, to the awake state from the doze state based on the third information in order to receive the first beacon frame from the AP;

receiving, from the AP by the STA, the first beacon frame including fifth information related to a trigger transmission time of a trigger frame soliciting the UL MU transmission from one or more STAs;

receiving, from the AP by the STA, a trigger frame based on the fifth information; and transmitting, to the AP by the STA in response to the trigger frame, an uplink frame for the UL MU transmission.

2. The method of claim 1, wherein the first information and the second information are used to determine the allocated TBTT and the allocated wake interval with respect to the AP, wherein the requested TBTT is a time requested by the STA to receive the first beacon frame, and wherein the requested wake interval is an interval requested by the STA to receive the subsequent beacon frames.

3. A station (STA) for performing an uplink (UL) multi-user (MU) transmission method while operating in a power save mode, comprising:

a transceiver implemented to transmit or receive a radio signal; and a processor operatively coupled to the transceiver, wherein the processor is configured for:

transmitting, to an access point (AP), a target wakeup time (TWT) request element including first information related to a requested target beacon transmission time (TBTT) of a first beacon frame and second information related to a requested wake interval between subsequent beacon frames the STA intends to receive;

receiving a TWT response element from the AP in response to the TWT request element, wherein the TWT response element includes third information related to an allocated TBTT of the first beacon frame and fourth information related to an allocated wake interval between the subsequent beacon frames;

switching to a doze state from the awake state after receiving the TWT response element;

switching to the awake state from the doze state based on the third information in order to receive the first beacon frame from the AP;

receiving, from the AP, the first beacon frame including fifth information related to a trigger transmission time of a trigger frame soliciting the UL MU transmission from one or more STAs;

receiving a trigger frame from the AP based on the fifth information; and transmitting an uplink frame to the AP for the UL MU transmission in response to the trigger frame.

4. The STA of claim 3, wherein the first information and the second information are used to determine the allocated TBTT and the allocated wake interval with respect to the AP, wherein the requested TBTT is a time requested by the STA to receive the first beacon frame, and wherein the requested wake interval is an interval requested by the STA to receive the subsequent beacon frames.

* * * * *